(12) United States Patent
Hammarlund et al.

(10) Patent No.: US 7,516,014 B2
(45) Date of Patent: Apr. 7, 2009

(54) SYSTEM AND A METHOD FOR AUTOMATIC AIR COLLISION AVOIDANCE

(75) Inventors: Henrik Hammarlund, Linkoping (SE); Bengt-Goran Sundqvist, Linkoping (SE)

(73) Assignee: Saab AB, Linköping (SE)

( * ) Notice: Subject to any disclaimer, the term of this patent is extended or adjusted under 35 U.S.C. 154(b) by 480 days.

(21) Appl. No.: 11/162,045

(22) Filed: Aug. 26, 2005

(65) Prior Publication Data
US 2007/0005247 A1    Jan. 4, 2007

(30) Foreign Application Priority Data
Aug. 31, 2004    (EP)    ................... 04020614

(51) Int. Cl.
*G06F 17/10*    (2006.01)

(52) U.S. Cl. ....................................... 701/301; 340/961

(58) Field of Classification Search ......... 701/300–302, 701/1, 3, 9; 340/988, 425.5, 945, 961; 342/29–32
See application file for complete search history.

(56) References Cited
U.S. PATENT DOCUMENTS 4,232,313 A * 11/1980 Fleishman ................... 342/36
5,596,332 A * 1/1997 Coles et al. ................... 342/455
5,636,123 A    6/1997 Rich et al.
6,133,867 A    10/2000 Eberwine et al.
6,314,366 B1 * 11/2001 Farmakis et al. ............ 701/201

FOREIGN PATENT DOCUMENTS

EP    1 329 863 A    7/2003

* cited by examiner

*Primary Examiner*—Yonel Beaulieu
(74) *Attorney, Agent, or Firm*—Venable LLP; Eric J. Franklin

(57) ABSTRACT

A system and a method for automatically avoiding collisions between own aircraft and other aircraft. The system includes a computing unit configured to compute a fly away path for own aircraft, a sender configured to send the computed own fly away path to the other aircraft, a receiver configured to receive fly away paths from the other aircraft, and a collision handler configured to detect an approaching collision based on the own fly away path and the fly away paths received from the other aircraft, and activating a fly away maneuver upon detecting an approaching collision. The collision handler is adapted to receive information about commanded maneuvers of own aircraft, and to detect an approaching collision based on own aircraft maneuvers commanded during a time period between sending the computed own fly away path to the other aircraft and detecting the approaching collision.

25 Claims, 2 Drawing Sheets

SYSTEM AND A METHOD FOR AUTOMATIC AIR COLLISION AVOIDANCE

FIELD OF THE INVENTION

The present invention relates to a method for avoiding collisions between airborne aircraft, more particularly, it relates to avoiding collisions using automatic collision avoidance systems.

BACKGROUND OF THE INVENTION

The purpose of an Automatic Air Collision Avoidance System (ACAS) is to prevent collisions in the air between aircraft, each having the system. A fly out is an automatic maneuver per-formed to avoid collision with another aircraft. Once the fly out maneuver is activated, maneuvers ordered from the pilot are disregarded. Each aircraft with the system continuously computes an escape angle and load factor to be used by the aircraft during a fly out maneuver for the case of an approaching collision. The escape angle is a relative roll angle. At the same time the aircraft computes optimized fly away paths in the air. The fly away paths are computed by means of an aircraft response model. The fly away path is a prediction of the space within which the aircraft will be located with a certain probability if a fly out maneuver will occur.

The fly away path is a trajectory in the air surrounded with a cone shaped space. The size of the cone shaped space surrounding the trajectory depends on uncertainties in the prediction of the fly away path. The uncertainties in the pre-diction is for example due to inaccuracy of the aircraft response model, timing accuracy of fly out activation due to inaccuracy in the assumption of when the fly out maneuver will begin, and last instant maneuvering. The computed fly away path is sent to the other aircraft. When the other aircraft receive a fly away path, the path is booked. Thus, the booked fly away paths are known to all neighboring aircraft having the system.

The aircraft continuously receives fly away paths from the other aircraft. The system detects an approaching collision based on the own fly away path and the fly away paths received from the other aircraft, and upon detecting an approaching collision activates the automatic fly out maneuver. During the fly out maneuver the aircraft is ordered to take the escape angle and load factor computed at the same time as the last booked fly away path. A collision is detected when the system detects that the own booked fly away path crosses a booked fly away path of another aircraft. The fly out maneuver should occur within a booked space that is known to the other aircraft. If no collision is detected the system computes a new escape angle and load factor to be used during a fly out maneuver, and a new fly away path based on the fly away paths received from the other aircrafts. The new fly away path is sent to the other aircraft.

A problem in connection with automatic air collision avoidance systems is that in some situations the uncertainties in the pre-diction are large. To make sure that the fly out maneuver is within the booked space of the fly away path, the width of the booked path is increased. When the width of the booked path is increased, the risk for nuisance is increased. With nuisance is meant an event, which results in an unintentional or unpredicted response or activation of the system. When the risk for unintentional or unpredicted activations of the fly out maneuver be-comes too high, the system for automatically avoiding collisions is turned off and by then the availability of the system is de-creased.

One of the factors affecting the uncertainties are last instant maneuvers of the aircraft during the time delay between computing a fly away path and receiving and booking the fly away path by the other aircraft. It takes approximately 0.3 s from computing the fly away path until the other aircraft have received the path. This problem is partly taken care of in known automatic air collision avoidance systems, by performing a prediction of aircraft movements during the following 0.3 s, and considering this prediction when computing the fly away path. This prediction assumes that the pilot maneuvers during the next 0.3 s are the same as in the prediction moment, i.e. that the position of the control stick is fixed. However, this is not always the case, on the contrary the pilot is free to perform maneuvers as he desires until an approaching collision is detected and the fly out maneuver is started. Particularly, there is a problem if the pilot performs maneuvers that counteract the booked fly away path during said time delay. In a worst case it may no longer be possible for the aircraft to follow the booked fly away path, due to the pilot maneuvers.

OBJECTS AND SUMMARY OF THE INVENTION

The object of the present invention is therefore to provide a solution to the problem described above, which reduces the risk that the aircraft will not be able to follow a booked fly away path, when detecting an approaching collision, and to keep the number of nuisances low.

According to the invention an approaching collision is detected based on own fly away path, fly away paths received from the other aircraft, as well as maneuvers of own aircraft commanded during a time period between sending the computed own fly away path to the other aircraft and detecting the approaching collision. Maneuvers commanded during the time period between sending the computed own fly away path to the other air-craft and detecting an approach collision, is in the following de-noted last instant maneuvers. Thus, the point in time when the fly out maneuver is activated is made dependent on last instant maneuvers of own aircraft. Preferably, the activation of the automatic collision avoidance system is advanced when the activation is close in time and commanded maneuvers of own air-craft counteract the own fly away path. Thus, the fly out maneuver is activated when the aircraft is maneuvered in such a way that the possibility to fly within a booked space rapidly becomes deteriorated. Accordingly, the possibility that the aircraft can fly within a booked fly out path if a collision is detected, is improved.

An advantage with this solution is that uncertainties due to un-predictable movements of the aircraft can be reduced, and thereby the width of the booked path is reduced, and thereby the risk for nuisances is reduced.

According to an embodiment of the invention the fly away paths are computed based on predicted maneuvers of own aircraft, and an approaching collision is detected based on deviations between the predicted maneuvers of own aircraft and commanded maneuvers of the own aircraft that counteracts the own fly away path. Preferably, an approaching collision is detected based on deviations between the predicted roll angles, and roll angles commanded during said time period. Last instant maneuvers can cause large errors in aircraft position compared to predicted positions. Especially roll commands can cause large errors in the position since the roll angle of the fly out is directly affected. The largest influence on the possibility to follow a booked fly out path appears when roll commands are applied during the last instant maneuvering of the aircraft in a direction counteracting the roll command during the fly out maneuver. This almost certainly means moving the flight path toward the others flight path. Thus, it is advantageous to base the collision detection on deviations in the roll angles.

According to another embodiment of the invention an approaching collision is also detected based on deviations between predicted pitch angles, and pitch angles commanded during said time period. Although the commanded roll angles have a larger influence on the possibility to follow a booked fly away path, than the commanded pitch angles, the influence on the fly away path by the pitch angels should not be neglected. This embodiment further improves the possibility to fulfill the booked fly out path.

The invention could be applied on manned as well as unmanned aircraft. According to a further embodiment of the invention an approaching collision is detected based on maneuvers commanded by a pilot, and the method comprises receiving pilot stick movements, and detecting an approaching collision based on pilot stick movements received during said time period. The aim of the invention is that if a collision is detected it is made sure that the own aircraft can fulfill the fly away path sent to the other aircraft. If stick movements during the time period between sending the own fly away path to the other aircraft and detecting the approach collision deteriorates the possibility to fulfill the booked fly out path, the fly out maneuver is activated immediately. This embodiment is suitable for manned aircraft having pilots issuing orders via a control stick.

According to an embodiment of the invention commanded maneuvers supporting the fly away path is disregarded. Thus, maneuvers commanded by the own aircraft are not allowed to delay the activation of the collision avoidance system; they can only advance the activation of the system. A roll command in the same direction as the computed escape angle causes the relative roll angle to be used during the fly out maneuver to decrease. The load factor is then commanded earlier, which means that a smaller load factor is needed to follow the fly out path. Thereby, commanded maneuvers supporting the fly away path should not contribute to advance the activation of the fly out action.

According to an embodiment of the invention said detecting of an approaching collision comprises computing an evasion condition based on the own fly away path, the fly away paths received from the other aircraft, and maneuvers of own aircraft commanded during said time period, and activating the automatic collision avoidance system if the evasion condition is fulfilled. The evasion condition is computed as the sum of a first contribution term, computed based on the received fly away paths and own fly away path, and a second contribution term, computed based on the maneuvers of own aircraft commanded during said time period. Whether or not the evasion condition is fulfilled is determined in dependences of if the evasion condition is below or above a threshold value. The value of the first contribution term depends on the risk for collision. The value of the second contribution term depends on whether or not the aircraft has been commanded to carry out unpredictable, disadvantageous maneuvers, which can lead to that a fly out maneuver can not take place within booked space, i.e. within the booked fly away path. According to this embodiment a term computed based on last instant maneuvers of own aircraft are added to the evasion condition. Thus, the time when the evasion condition is fulfilled, i.e. the time when an approaching collision is detected, is made dependent on the last instant maneuvers of own aircraft According to an embodiment of the invention the value of said second term, which is computed based on last instant maneuvers of own aircraft, is made dependent of the risk for collision. The value of the second contribution term is reduced if there is no risk for collision. Thereby, the maximum contribution of this term is limited and the risk for nuisances is reduced.

According to an embodiment of the invention it comprises add-ing all roll commands commanded during said time period which counteracts the own fly away path, and adding all pitch commands commanded during said time period which counteracts the own fly away path, and on bases thereof calculating the second contribution term. This embodiment further improves the possibility to fulfill the booked fly out path.

According to another aspect of the invention this object is achieved by a system.

According to a further aspect of the invention, the object is achieved by a computer program directly loadable into the internal memory of a computer or a processor, comprising software code portions for performing the steps of the method according to the invention, when said program is run on a computer. The computer program is provided either on a computer readable medium or through a network, such as the Internet.

According to another aspect of the invention, the object is achieved by a computer readable medium having a program re-corded thereon, when the program is to make a computer per-form the steps of the method according to the invention, and said program is run on the computer.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
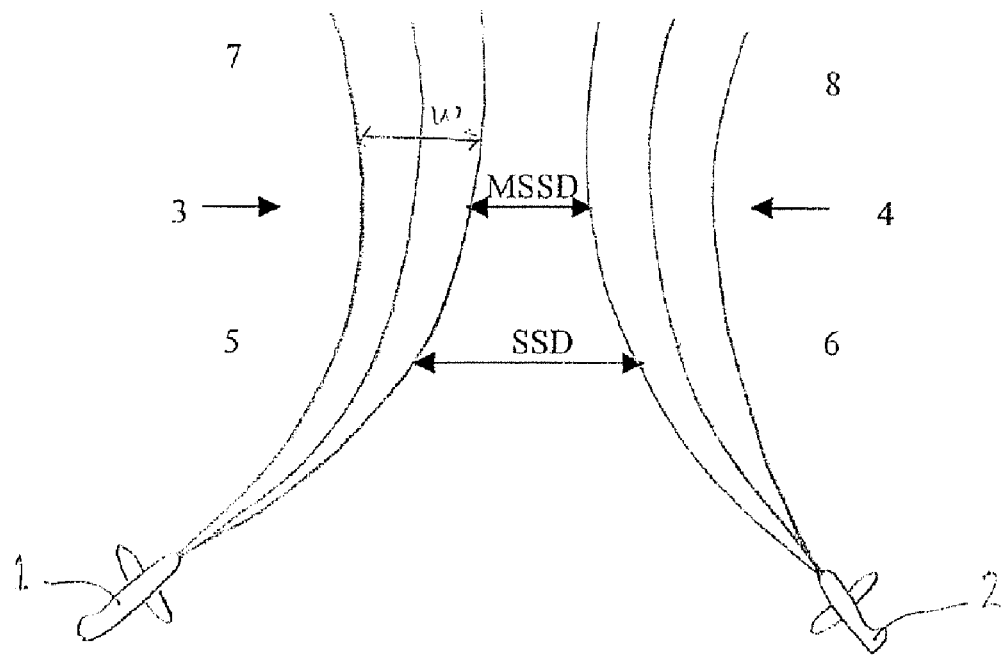
FIG. 1 shows fly away paths for two aircraft.

FIG. 1 shows two aircraft 1 and 2 each comprising an automatic collision avoidance system. Each aircraft computes a fly away path 3, 4. The fly away path is a trajectory 5, 6 in the air, which is surrounded with a cone shaped space 7, 8. The width w of the cone shaped space 7, 8 surrounding the trajectory 5, 6 depend on uncertainties in the computation of the fly away path. The uncertainties, and consequently the width of the fly away path, increase with the time. The fly away path comprises two parts. A first part of the fly away path comprises a prediction of aircraft movements assuming that the pilot maneuvers during the next 0.3 s are the same as in the prediction moment, i.e. that the position of the control stick is fixed. This prediction takes care of the time between when the fly away path is calculated and the other aircraft will receive the fly away path. The second part of the fly away path predicts the fly out maneuver and is based on a computed escape angle.

When an aircraft has computed a fly away path, information about the path is sent to the other aircraft. The other aircraft books the space of the fly away path upon receiving it. The trajectory 5, 6 can be described as a function of time, and the information about the fly away path which is sent to the other air-craft comprises three points in the air, two velocity vectors in the flying function, and a value representing the uncertainties of the computation. The control systems of the other aircraft then model a spline function using the received information.

According to this embodiment, detecting an approaching collision means detecting that a computed and booked fly away maneuver can not be carried out. An approaching collision is detected when it is detected that the own computed fly away path brush against any of the other aircraft's fly away path. The distance between the fly away paths depends on the time, and is described mathematically in the following equation:

$$SSD(t)=|H(t)-I(t)|-DSD(t) \quad (1)$$

H(t) is the predicted fly out path 3 of own aircraft, and I(t) is the predicted fly away path 4 of an intruder aircraft. DSD is the de-sired separation distance between the fly away paths, and is the sum of the booked space between of fly away paths. DSD is computed from the uncertainties and it represents the size of the booked space. The uncertainties comprise computation uncertainties such as uncertainties in the aircraft response model.

A minimum safe separation distance, called hereafter MSSD, is defined as the minimum separation distance between the fly away paths and appears at time $t_{min}$ after activation of the fly out maneuver.

A collision is detected in dependence of whether or not an evasion condition, denoted EC, is below or above a threshold value. EC is computed using the MSSD and its rate of change according to the following equation:

$$EC=MSSD+d/dt(MSSD)\cdot t_{prediction}+PIC \quad (2)$$

$t_{prediction}$ is the time period between two iterations in the computation loop.

A term called Pilot Input Contribution, denoted hereafter PIC, which depends on aircraft maneuvers is added to the computation of the EC for the purpose of punishing pilot input counter acting the fly out maneuver. EC comprises a first contribution term including the MSSD and its time derivate multiplied with $t_{prediction}$ and a second contribution term computed based on the maneuvers of own aircraft commanded during a time period between sending the computed own fly away path to the other air-craft and detecting the approach collision. An approaching collision is detected if EC is below a threshold value, denoted TV.

It is important that PIC is conservative meaning that commanded maneuvers supporting the fly away path shall not allow smaller MSSD, i.e. maneuvers supporting the fly away path are not allowed to influence the value of EC and consequently to influence the point in time when the fly out maneuver is activated. Thus, a condition is that PIC must be below or equal to zero:

$$PIC \leq 0 \quad (3)$$

In order to avoid reduce the effect of nuisance during the fly out path the upper limit of PIC should be lower than zero. The lower limit of PIC is a function $F_1$ of $t_{min}$ and possibly also of other variables. The function $F_1$ is close to or equal to zero when there is no risk for a collision and it has a large negative value at situations with high risk for a collision. The idea of $F_1$ is to limit the maximum magnitude of the variable PI. If PI is defined to have a maximum value of zero, PIC can be expressed as:

$$PIC=\max[F_1(t_{min}), PI] \quad (4)$$

PI is the total sum of all pilot input during the delay of last instant pilot maneuvering that deteriorates the possibility to fulfil the booked fly away path. The largest part of PI is dependant of the pilot roll commands, and a smaller part is dependent on pitch commands. PI can be divided into two parts, one that handles all disadvantageous roll commands, i.e. roll commands that counteract the roll command of the fly out maneuver, and one that handles all disadvantageous pitch commands. If roll commands, denoted PIR, as well as pitch commands, denoted PIP, are included, PI can be expressed as:

$$PI=PIR+PIP \quad (5)$$

To fulfil the condition 3 above, i.e. that PIC should be below zero, both PIR and PIP must have a maximum value of zero. PIP can be set to zero if it is considered that pilot pitch commands can be neglected.

In roll, the idea is to collect all roll commands in the wrong direction compared to the roll command used during the computation of the fly out path. PIR can for example be expressed as:

$$PIR = K_1 \sum_t \min[(P_{ESS} - P_{ARM}) \cdot \text{sign}(EA), 0] \quad (6)$$

$P_{ESS}$=roll angles commanded by the pilot.
$P_{ARM}$=roll angles used during the computation of the fly away path
EA=escape angle
$K_1$=a scale factor Here the difference between the current roll command and the roll command used during the computation of the fly away path is multiplied with the direction of the escape angle and added over time. The escape angle is a relative roll angle. If the difference is positive, i.e. the pilots roll command is larger than the roll command used in the prediction, and if the roll command is in the direction of the escape angle, zero is added. The sum is multiplied with a positive scale factor $K_1$ in order to weigh the amount of PIR in PI In pitch the idea is to collect pilot pitch commands larger than those used in the prediction, at occasions when the escape an-gle is large. PIP can for example be expressed as:

$$PIP = \quad (7)$$
$$-K_2 \cdot (1 - \cos(EA)) \cdot \sum_t \max[|NZ_{ESS} - \cos\theta| - |NZ_{ARM} - \cos\theta|, 0]$$

$NZ_{ESS}$=the commanded pitch angles
$NZ_{ARM}$=the load factor used during the computation of the fly away path
$K_2$=a scale factor Here both the current pitch command and the pitch command used for the prediction are compared to the optimal load factor for roll ($1 \times \cos \theta$). The magnitude of the comparison is compared, and the difference in magnitude of the pilot part and the predicted part is estimated. The maximum function is used to find only the occasions when the pilot part is larger than the predicted part. In other words, the second part of the expression punishes pilot pitch commands that are larger in magnitude than those used during the prediction compared to the optimal load factor for roll.

The first part of the expression is for scaling the result of the second part. $K_2$ is a positive scale factor. $1-\cos(EA)$ is close to zero when the escape angle is small and increases with increasing escape angles.

The size of $K_1$, $K_2$ and the lower limit of PI is a balance between the risk for nuisance and the position width w of the fly away path during the fly out maneuver. For a worst-case scenario, the time before early activation should probably be close to 0,1 seconds.

Figure 2:
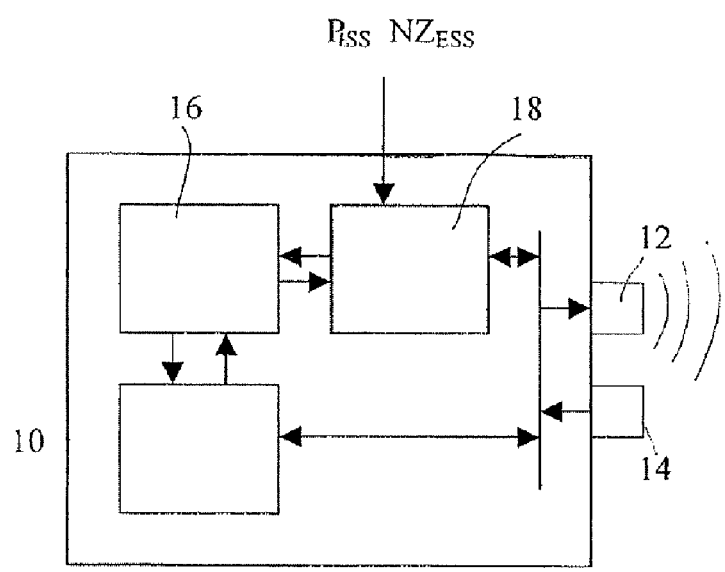
FIG. 2 shows a block diagram over a system for automatically avoiding collisions according to the invention.

FIG. 2 shows a system for automatic avoiding of collisions ac-cording to an embodiment of the invention. The system com-prises a computing unit 10 adapted for a computing an escape angle and a load factor to be used during a fly out maneuver, and a fly away path to be sent to the other aircraft. The escape angle, the load factor and the fly away paths are computed based on an aircraft response model and fly away paths received from other aircraft. The first 0,3 second of the fly-away path is a prediction based on an assumption that the aircraft will continue to be maneuvered in accordance with the last ordered maneuver. The second part of the fly out path is computed based on the escape angle and load factor computed.

The system further comprises a sender 12 sending the computed fly away path to other aircraft and a receiver 14 receiving fly away paths from the other aircrafts. The system comprises a data storage 16 adapted for storing the computed escape angle, load factor and fly away path. The system is preferably implemented in the control system of an aircraft, and uses the computer of the aircraft.

The system comprises a collision handler 18 adapted to detect an approaching collision based on own fly away path and fly-away paths received from the other aircraft and acti-vating a fly-away maneuver upon detecting an approaching collision. A collision handler 18 is adapted to receive com-manded maneuvers of own aircraft and detect an approaching collision based on own aircraft maneuvers commanded dur-ing a time period between sending the computed own fly-away path to the other aircraft and detecting the approaching collision.

Figure 3:
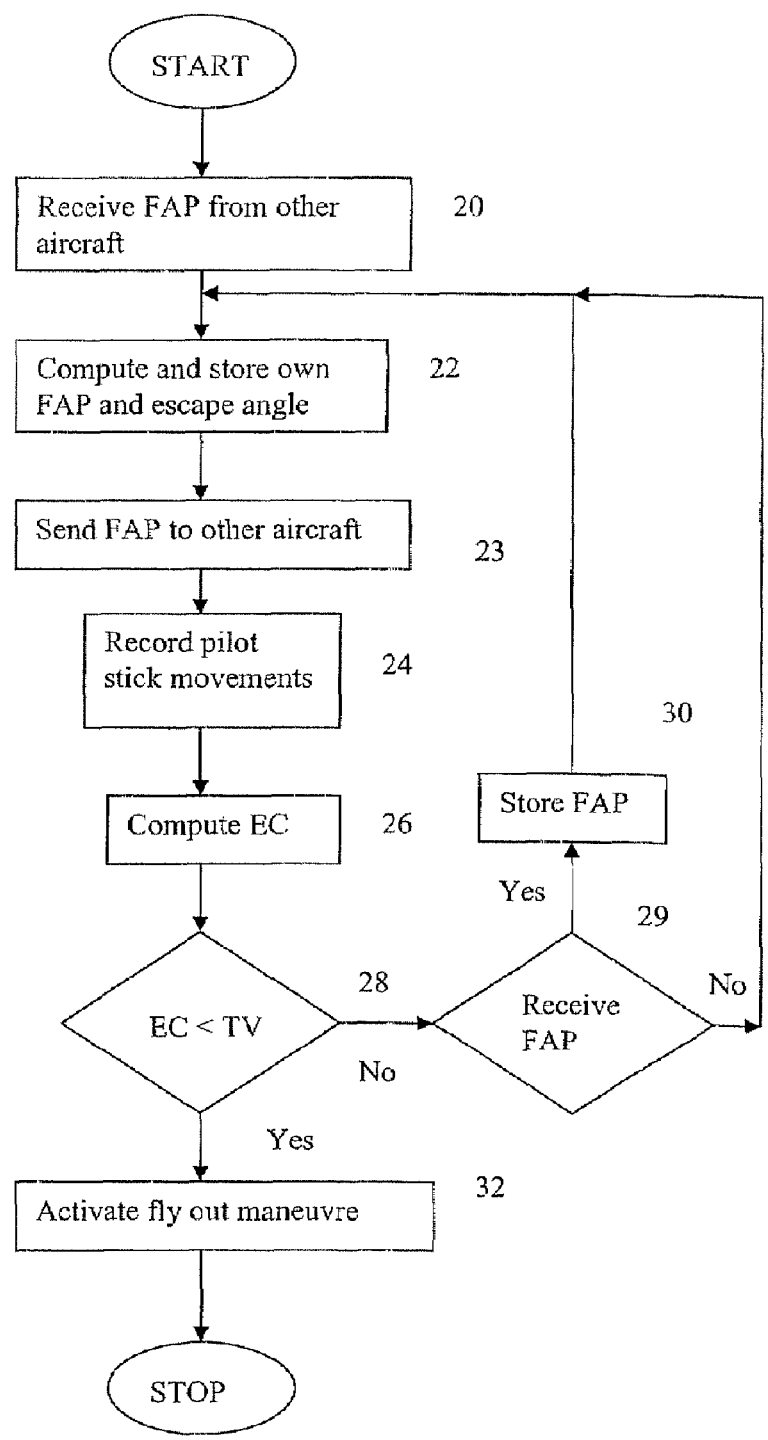
FIG. 3 shows a flow diagram over a method for automatically avoiding collisions according to an embodiment of the invention.

FIG. 3 shows a flow diagram of a method and computer pro-gram product according to an embodiment of the present invention. It will be understood that each block of the flow diagram can be implemented by computer program instruc-tions. The sys-tem receives fly-away paths from other aircraft, block 20. The received fly-away paths are stored until new fly-away paths are received. A newly received fly away path replaces the previously received and stored fly away path. As shown in block 22 an es-cape angle, a load factor and fly away path, denoted FAP, are computed for own aircraft based on the received fly away paths from the other aircrafts. The comput-ing comprises predicting movements of the aircraft during the following 0,3 seconds. The computed escape angle, load fac-tor and fly away path are stored. The computed fly away path is sent to other aircraft for booking, block 23. From that moment, pilot stick movements are recorded, block 24, and on basis thereof an evasion condition, denoted EC, is calcu-lated, according to equation 2.

Before calculating the evasion condition, PIR and PIP are calculated according to equations 6 and 7 based on the recorded pilot stick movements and the roll and pitch angles predicted in block 20. Thereafter, PI is computed according to equation 5 and PIC is computed according to equation 4. MSSD and its derivative are determined based on the own fly away path and the received fly away paths from the other aircraft. EC is computed according to equation 2, block 26. In block 28 it is determined whether there is an approaching collision or not, based on the computed value of EC. If EC is below the threshold value TV an approaching collision is detected and the fly-out maneuver is activated, block 32, otherwise no collision is detected and the method is repeated by calculating a new escape angle, load factor and a new fly-away path, block 20. If new fly away paths are received from the other aircraft they are stored and the next computa-tion of own fly away path is based thereon, block 29, 30. Then, the computation loop comprising block 22-28 is repeated with a predetermined frequency.

Although the invention has been described in some respects with reference to specified embodiments, variations and modifications will become apparent to those skilled in the art. It is therefore the intention that the following claims not be given a restrictive interpretation but should be viewed to encompass variations and modifications that are derived from the inventive subject matter disclosed.

What is claimed is:

1. A method for avoiding collisions between own aircraft and one or more other aircraft, wherein each aircraft com-prises an automatic collision avoidance system, the method comprising:
   computing a fly away path for own aircraft,
   sending the computed own fly away path to the other air-craft,
   receiving fly away paths from the other aircraft,
   detecting an approaching collision based on the own fly away path and the fly away paths received from the other aircraft, and
   activating a fly out maneuver upon detecting an approach-ing collision,
   wherein detection of an approaching collision is based on commanded maneuvers of own aircraft commanded during a time period between sending the computed own fly away path to the other aircraft and detecting the approaching collision, wherein the method comprises receiving the commanded maneuvers and detecting an approaching collision based on the commanded maneu-vers received during said time period.

2. The method according to claim 1, further comprising:
   advancing the activation of the fly out maneuver based on commanded maneuvers of the own aircraft that counter-acts the own fly away path.

3. The method according to claim 2, wherein the fly away path is computed based on predicted maneuvers of own air-craft, and wherein detecting an approaching collision is based on deviations between the predicted maneuvers of own air-craft and the commanded maneuvers of the own aircraft that counteract the own fly away path.

4. The method according to claim 1, wherein the com-manded maneuvers comprise roll commands, and wherein an approaching collision is detected based on the roll commands commanded during said time period.

5. The method according to claim 4, wherein the com-manded maneuvers comprise pitch commands, and wherein an approaching collision is detected based on the pitch com-mands commanded during said time period.

6. The method according to claim 1, wherein the com-manded maneuvers are commanded by a pilot, and wherein an approaching collision is detected based on the maneuvers commanded by the pilot, the method further comprising:
   receiving pilot stick movements, and
   detecting an approaching collision based on pilot stick movements received during said time period.

7. The method according to claim 1, wherein commanded maneuvers supporting the fly away path are disregarded.

8. The method according to claim 1, wherein said detection of an approaching collision comprises:
   computing an evasion condition based on the own fly away path, the fly away paths received from the other aircraft, and maneuvers of own aircraft commanded during said time period, and activating the fly out maneuver if the evasion condition is fulfilled.

9. The method according to claim 8, wherein computing the evasion condition comprises:
computing a first contribution term based on the received fly away paths and own fly away path, and
computing a second contribution term based on the maneuvers of own aircraft commanded during said time period, and
adding the first and second contribution terms,
the method further comprising:
determining whether or not the evasion condition is fulfilled in dependences of if the evasion condition is below or above a threshold value.

10. The method according to claim 9, wherein the value of the second contribution term is made dependent on the risk for collision.

11. The method according to claim 9, further comprising:
adding all roll commands commanded during said time period which counteracts the own fly away path,
adding all pitch commands commanded during said time period which counteracts the own fly away path, and
calculating the second contribution term based on the added roll commands and the added pitch commands.

12. The method according to claim 9, wherein computing said first contribution term comprises
computing a minimum separation distance between the received fly away paths and own fly away path, and
computing the rate of change of the minimum separation distance.

13. A computer program product, comprising:
a computer readable medium; and
computer program instructions recorded on the computer readable medium and executable by a processor for carrying out a method for avoiding collisions between own aircraft and one or more other aircraft, wherein each aircraft comprises an automatic collision avoidance system, comprising:
computing a fly away path for own aircraft,
sending the computed own fly away path to the other aircraft,
receiving fly away paths from the other aircraft,
detecting an approaching collision based on the own fly away path and the fly away paths received from the other aircraft, and
activating a fly out maneuver upon detecting an approaching collision,
wherein detection of an approaching collision is based on commanded maneuvers of own aircraft commanded during a time period between sending the computed own fly away path to the other aircraft and detecting the approaching collision, wherein the method comprises receiving the commanded maneuvers and detecting an approaching collision based on the commanded maneuvers received during said time period.

14. A computer program product, comprising:
a computer readable medium; and
computer program code recorded on the computer readable medium and executable by a processor, wherein the program code includes sets of instructions comprising:
first computer instructions for computing a fly away path for own aircraft,
second computer instructions for sending the computed own fly away path to the other air-craft,
third computer instructions for receiving fly away paths from the other aircraft,
fourth computer instructions for detecting an approaching collision based on the own fly away path and the fly away paths received from the other aircraft, and
fifth computer instructions for activating a fly out maneuver upon detecting an approaching collision,
wherein detection of an approaching collision is based on commanded maneuvers of own aircraft commanded during a time period between sending the computed own fly away path to the other aircraft and detecting the approaching collision, wherein the method comprises receiving the commanded maneuvers and detecting an approaching collision based on the commanded maneuvers received during said time period.

15. A system for automatically avoiding collisions between own aircraft or one and more other aircraft, the system comprising:
a computing unit adapted to compute a fly away path for own aircraft,
a sender adapted to send the computed own fly away path to the other aircraft,
a receiver adapted to receive fly away paths from the other aircraft,
a collision handler adapted to detect an approaching collision based on the own fly away path and the fly away paths received from the other aircraft, and to activate a fly away maneuver upon detecting an approaching collision, wherein said collision handler is adapted to receive information about commanded maneuvers of own aircraft, and to detect an approaching collision based on commanded own aircraft maneuvers commanded during a time period between sending the computed own fly away path to the other aircraft and detecting the approaching collision.

16. The system according to claim 15, wherein said collision handler adapted to advance the activation of the fly out maneuver based on commanded maneuvers of own aircraft that counteract the own fly away path during said time period.

17. The system according to claim 15, wherein said computing unit is adapted to compute the fly away path based on predicted maneuvers of own aircraft, and wherein said collision handler is adapted to detect an approaching collision based on deviations between the predicted maneuvers of own aircraft and commanded maneuvers of the own aircraft that counteract the own fly away path.

18. The system according to claim 15, wherein the commanded maneuvers comprise roll commands, and wherein said collision handler is adapted to detect an approaching collision based on the roll commands commanded during said time period.

19. The system according to claim 15, wherein the commanded maneuvers comprise pitch commands, and wherein said collision handler is adapted to detect an approaching collision based on the pitch commands commanded during said time period.

20. The system according to claim 15, wherein the commanded maneuvers are commanded by a pilot, and wherein said collision handler is adapted to record the pilot stick movements and detect an approaching collision based on the pilot stick movements recorded during said time period.

21. The system according to a claim 15, wherein said collision handler is adapted to advance the activation of the automatic collision avoidance if the commanded maneuver counteracts the fly away path, and to disregard the commanded maneuver if the commanded maneuver supports the fly away path.

22. The system according to claim 15, wherein said collision handler is adapted to compute an evasion condition based on the own fly away path, the fly away paths received from the other aircraft, and maneuvers of own aircraft commanded during said time period, and to activate the fly out maneuver if the evasion condition is fulfilled.

23. The system according to claim 22, wherein said collision handler is adapted to compute a first contribution to said evasion condition based on the received fly away paths and own fly away path, to compute a second contribution to said evasion condition based on maneuvers of own aircraft commanded during said time period, and to determine whether or not the evasion condition is fulfilled in dependences of if the evasion condition is below or above a threshold value.

24. The system according to claim 23, wherein the value of the second contribution to the collision handler is dependent of the risk for collision.

25. The system according to claim 23, wherein said collision handler is adapted to add all roll commands commanded during said time period which counteract the own fly away path, add all pitch commands commanded during said time period which counteract the own fly away path, and calculate the second contribution term based on the added roll commands and added pitch commands.

* * * * *